United States Patent
Au et al.

(10) Patent No.: US 12,423,079 B2
(45) Date of Patent: Sep. 23, 2025

(54) DEPLOYING IMMUTABLE IMAGE SOFTWARE ONTO BRANCH RETAIL DEVICES

(71) Applicant: JPMorgan Chase Bank, N.A., New York, NY (US)

(72) Inventors: Kin Au, New York, NY (US); Thomas Skinner, New York, NY (US); Steven Burd, New York, NY (US); Russell White, New York, NY (US); Kevin Sharb, New York, NY (US); Chad Miller, New York, NY (US); Abhishek Mahajan, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 133 days.

(21) Appl. No.: 18/236,357

(22) Filed: Aug. 21, 2023

(65) Prior Publication Data
US 2025/0068407 A1     Feb. 27, 2025

(51) Int. Cl.
*G06F 8/61*     (2018.01)

(52) U.S. Cl.
CPC ..................... *G06F 8/63* (2013.01)

(58) Field of Classification Search
CPC ..................... G06F 8/63; G06F 8/65
See application file for complete search history.

(56) References Cited

U.S. PATENT DOCUMENTS

| | | | | |
|---|---|---|---|---|
| 10,409,582 | B1* | 9/2019 | Maehler | G06F 8/65 |
| 2007/0157192 | A1* | 7/2007 | Hoefler | G06F 8/65 |
| | | | | 717/168 |
| 2009/0083404 | A1* | 3/2009 | Lenzmeier | G06F 15/16 |
| | | | | 709/221 |
| 2011/0145809 | A1* | 6/2011 | Hwang | G06F 8/65 |
| | | | | 717/173 |
| 2021/0224074 | A1* | 7/2021 | O'Dell | G06F 1/24 |
| 2025/0004742 | A1* | 1/2025 | Yuan | G06F 8/65 |

* cited by examiner

*Primary Examiner* — Marina Lee
(74) *Attorney, Agent, or Firm* — Greenblum & Bernstein, P.L.C.

(57) ABSTRACT

In one example, a storage medium with program instructions to deploy immutable-image software to retail branch devices is disclosed. The operations include accessing a user-interface change request to initiate an event on a remote computer system. The event is a deployment of immutable branch-image software to alter or reimage existing software on the remote computer system. The operations include authenticating an identity of a user interface operator, publishing an event message (preload and build) on a messaging databus. An agent communicating with the remote computer system subscribes to the messaging databus. The operations for that include subscribing, by an agent on the remote computer system, to the messaging databus for the event message, storing the immutable branch-image software in a repository accessible via a secure network socket, retrieving the immutable branch-image software onto the remote computer system, and triggering installation of the immutable branch-image software on the remote computer system.

19 Claims, 10 Drawing Sheets

DEPLOYING IMMUTABLE IMAGE SOFTWARE ONTO BRANCH RETAIL DEVICES

BACKGROUND

Large enterprise networks often have hundreds if not thousands of computing devices. The computing device themselves may include or process highly sensitive data that is subject to privacy and governmental regulations. Examples of such enterprise platforms can include healthcare platforms, financial and banking enterprise platforms, information technology enterprise platforms, etc. Audits may be mandated to ensure that the enterprise platforms and any associated computing software/devices meet certain standards.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

From time-to-time, software that is deployed on large enterprise platforms may need to be patched to meet new security standards, for example. However, there can be difficulties associated with the patching process. On a large enterprise platform with geographically-distributed devices, the patching process can cause configuration drift. Configuration drift refers to the application of inconsistent configurations across computers or devices in a geographically distributed network. Another difficulty associated with patching is that making changes to working systems often requires business downtime, which becomes even more difficult when the retail branch computing devices are spread out, geographically across many different time zones. Further, the health of many of the updated retail branch devices cannot be easily monitored and tracked.

The present invention disclosure addresses the foregoing by providing a system for deploying immutable branch-image software onto branch retail devices. The system begins by accessing a signal, over a network through a network communication interface, to initiate an event on a remote branch computer system. The signal for the event can be generated by a user via the user interface of an event management utility or engine.

Here, the user may deploy immutable branch-image software or other software alteration onto selected branch retail devices across a geographically distributed enterprise. Once the user request is received, the event is associated with the deployment of immutable branch-image software to alter or reimage existing software stored or executed on the remote branch computer system. By deploying immutable images, different and separate pieces of update patching are avoided thus eliminating configuration drift and associated gradual changes that are inconsistent with the environment.

The event management utility of the present disclosure also creates signal-based events and issues real-time commands to all remote branch retail devices across the network. In this manner, the health status and target state of remote branch retail devices are always available.

After the event is created, the system publishes a branch-image deployment event message for the event onto a messaging databus. The immutable branch-image deployment event message can include both a preload event message and a build event message for the immutable image deployment.

The system includes an agent residing on the remote branch computer system, which subscribes to the messaging databus for the preload event message and the build event message. The system stores the immutable branch-image software in a repository that is accessible via a secure network socket.

The system monitors the messaging databus to detect the preload event; and in response to detecting the preload event message, the agent downloads the immutable branch-image software from the repository onto the remote branch computer system for staging. The agent also monitors the messaging databus to detect the build event message; and in response detecting the build event message, triggers the installation of the downloaded immutable branch-image software on the remote branch computer system. In this manner, the system deploys immutable branch-images to every branch retail device, so that branch retail devices adhere to standards and report up correctly; moreover, drift and out-of-compliance devices are can be monitored.

Figure 1:
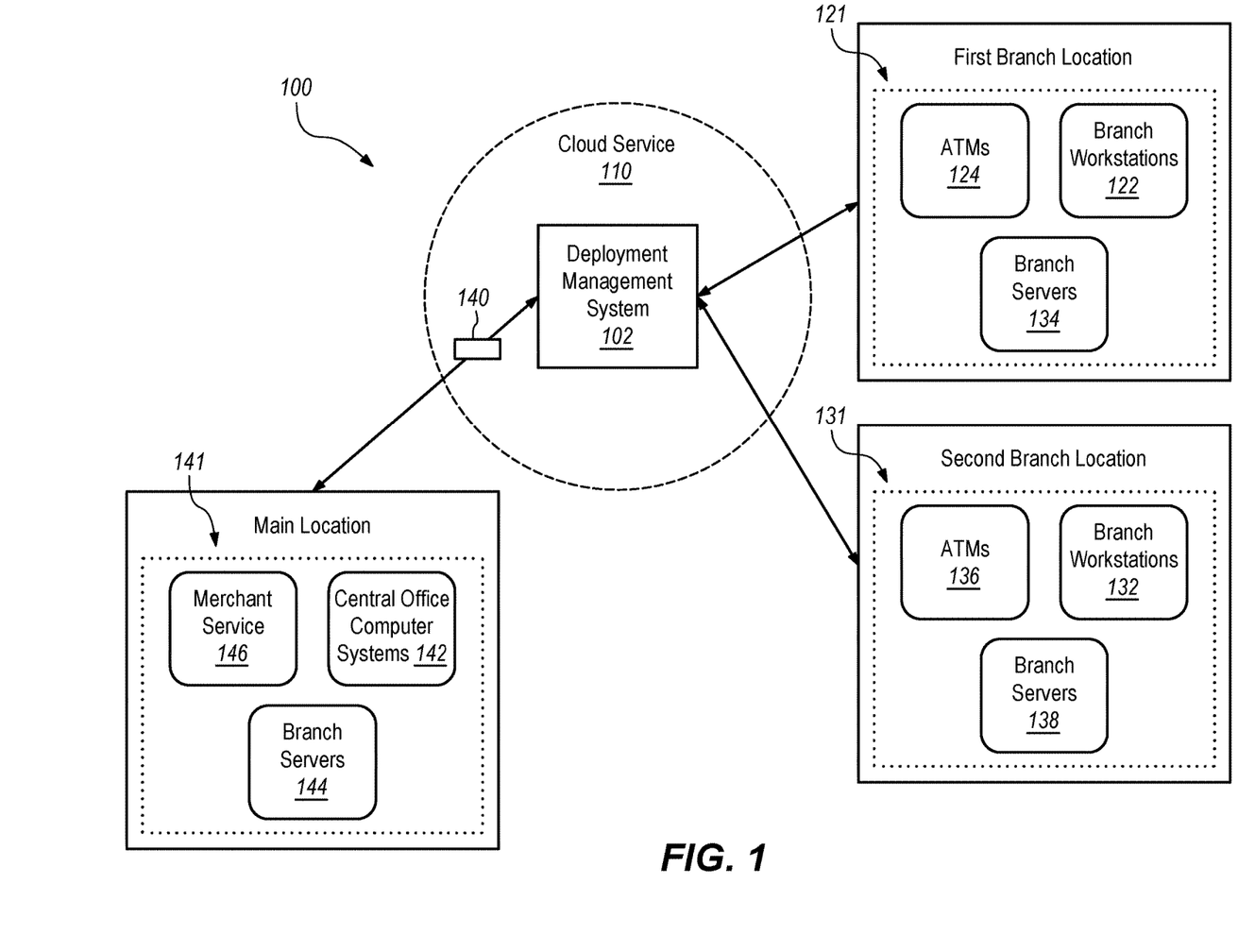
FIG. 1 illustrates an event management and immutable-images deployment platform according to an example of the present disclosure.

FIG. 1 illustrates an event management and immutable-images deployment platform 100 according to an example of the present disclosure.

In FIG. 1, the event management deployment platform 100 can initiate, manage and coordinate events and messages to deploy immutable images. As used herein, an immutable image refers to a software object or code that cannot be changed, modified, updated or patched.

The immutable images can be deployed across any large multi-branch enterprise system with many retail computing devices. For example, event management and deployment platform 100 may be incorporated by a healthcare, government, banking institution, etc., with numerous geographically dispersed branches and locations and corresponding retail branch devices. Once initiated by a user, the system manages the entirety of the immutable image deployment onto retail branch devices without further user interaction and simplifies what can be a relatively complex deployment process.

In this example, event management and deployment platform 100 includes a cloud service 110 incorporating a deployment management system 102. The cloud service 110 can be a public cloud service, a private cloud service, or a hybrid (public/private) cloud service. For example, the cloud service 110 can be a public cloud such as AWS™ to provide cloud services to subscribers and customers.

The deployment management system 102 is communicably coupled to multiple branch locations including a first branch location 121 and a second branch location 131 and a main location 141. Other branch locations are not illustrated for brevity. The deployment management system 102 may manage and coordinate the deployment of immutable images, software or software alterations to numerous branch locations including the first branch location 121 and second branch location 131.

Here, the first branch location 121 includes a number of branch retail devices including ATMs (Automatic Teller Machines) 124, multiple branch workstations 122 and multiple branch servers 134, some or all of which branch retail devices may receive immutable images or other software alterations at periodic intervals. The branch retail devices are collectively referred to as first branch retail devices 121.

Likewise, the second branch location 131 may include one or more ATMs (Automatic Teller Machines) 136, numerous branch workstations 132 and multiple branch servers 138, all collectively referred to as second branch retail devices 131.

The main location 141, which is coupled via a network communication interface 140 to the deployment management system 102, includes a merchant service 146, a main computer system 142 and a number of branch servers 144. Use and operation of the event management and deployment platform 100 will now be described with reference to the FIG. 2 below.

Figure 2:
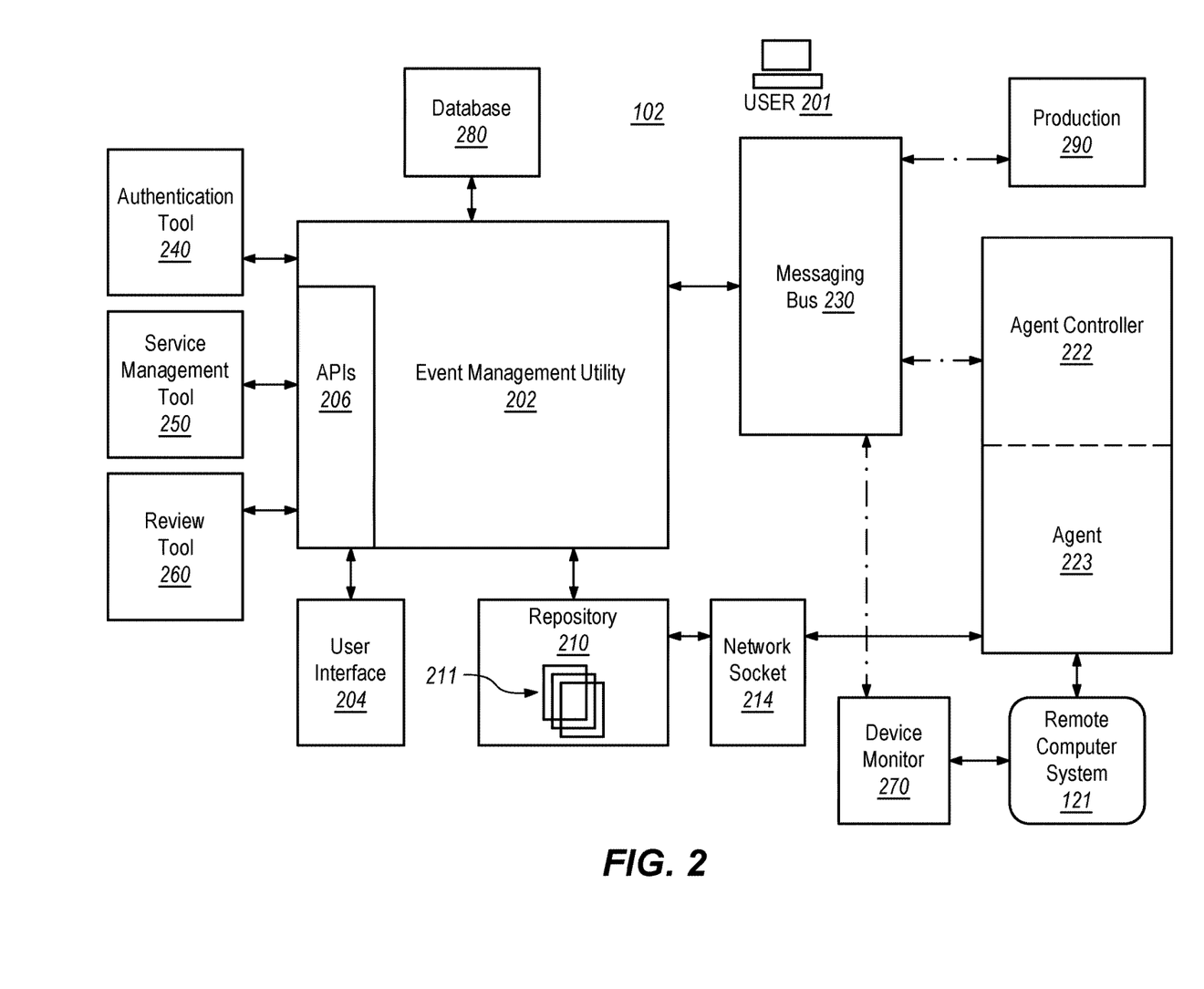
FIG. 2 illustrates a block diagram of an architecture of the deployment management system of FIG. 1 according to examples of the present disclosure.

FIG. 2 illustrates a block diagram of an architecture of the deployment management system 102 of FIG. 1 according to examples of the present disclosure.

As noted above, the deployment management system 102 can manage events related to deployment of immutable images, software and software alterations to the first and second branch retail devices 121, 131 and the main location 141 computing devices. At the core of the deployment management system 102 is an event management engine or utility 202 that serves as a command control center and interfaces with an authentication tool 240, a service management tool 250 and a review tool 260 via Application Programming Interfaces (APIs) 206.

Here, APIs 206 facilitate, without user interaction, the exchange of information between event management utility 202 and each one of service management tool 250 and review tool 260. The APIs facilitate information exchange to accomplish deployment of immutable images.

Event management utility 202 also interfaces with a messaging databus 230, a repository 210 and a user interface 204 that a user 201 can employ to initiate an immutable-image deployment event. As mentioned above, immutable image deployment may be desirable for various reasons. Existing software such as an OS (Operating System) on a remote branch computer system may require patching to meet new security standards. Without patching, the network infrastructure may be exposed to malware, hackers and other bad actors that can gain unauthorized access to private personal information or worse bring down or damage the entire network infrastructure.

Within a larger network infrastructure with thousands of retail branch devices including workstations, ATMs, merchant services terminals, software alteration deployment can be difficult. When the retail branch device software is patched to meet new security stands (for example), the patching is often piece-meal. Existing base software may be followed by different and separate pieces of update patches. This can cause configuration drift or gradual changes that are inconsistent with the environment, which can trigger instability, unexpected system behavior and/or downtime. Configuration drift can also cause a major impact on security vulnerability management. Further, drift may lead cause an inability to monitor and track the health of the retail branch devices.

Many of the branch retail devices may be inactive and a large number such devices may be in different time zones such that software event coordination is necessary. Even when active, a branch retail device may lack readiness for the alteration if the device is unhealthy.

The event management utility 202 coordinates and administers dynamic or static events to cause deployment of software alterations or immutable images onto a large number of branch retail devices so that such devices can adhere to standards and report up correctly, drift can also be monitored and out-of-compliance devices can be detected. In one implementation, the event management utility 202 coordinates immutable-image deployment events by publishing branch-image deployment event messages onto the messaging databus 230. As will be further discussed, in one implementation, the branch-image deployment event messages may include preload event messages and build event messages.

In operation, the user 201 may wish to deploy immutable images or other software alteration onto the first branch retail devices 121, the second branch retail devices 131 and the main location 141 computing devices. The user 201 begins by interacting with the user interface 204 (e.g., a browser) to access event management utility 202. In turn, the event management utility 202 redirects the user to the authentication tool 240.

The authentication tool 240 authenticates user 201 to confirm that the user is an authorized user. For example, if user 201 is a release engineer, for example, authentication tool 240 can authenticate that the user is an approved user and is authorized to implement the software deployment event. Authentication tool 204 identifies who is using system and can trace the user's activities. An example of authentication tool 204 that can be utilized with the present disclosure is IDAnywhere™. After user authentication, the user 210 is directed to the service management tool 250.

The service management tool 250 may receive from the user a change request for the software deployment or alteration. As used herein, a "change request" is a proposal for the deployment or alteration to a product or system. Service management tool 250 manages change requests and corresponding approvals, and provides a catalog of information technology services as well as application support to the enterprise. An example of service management tool 250 us ServiceNow™. In response to the change request, the service management tool 250 generates a change ticket associated with the change request. The change ticket includes the details of user 201's request to deploy immutable images as entered via the user interface 204.

Figure 3:
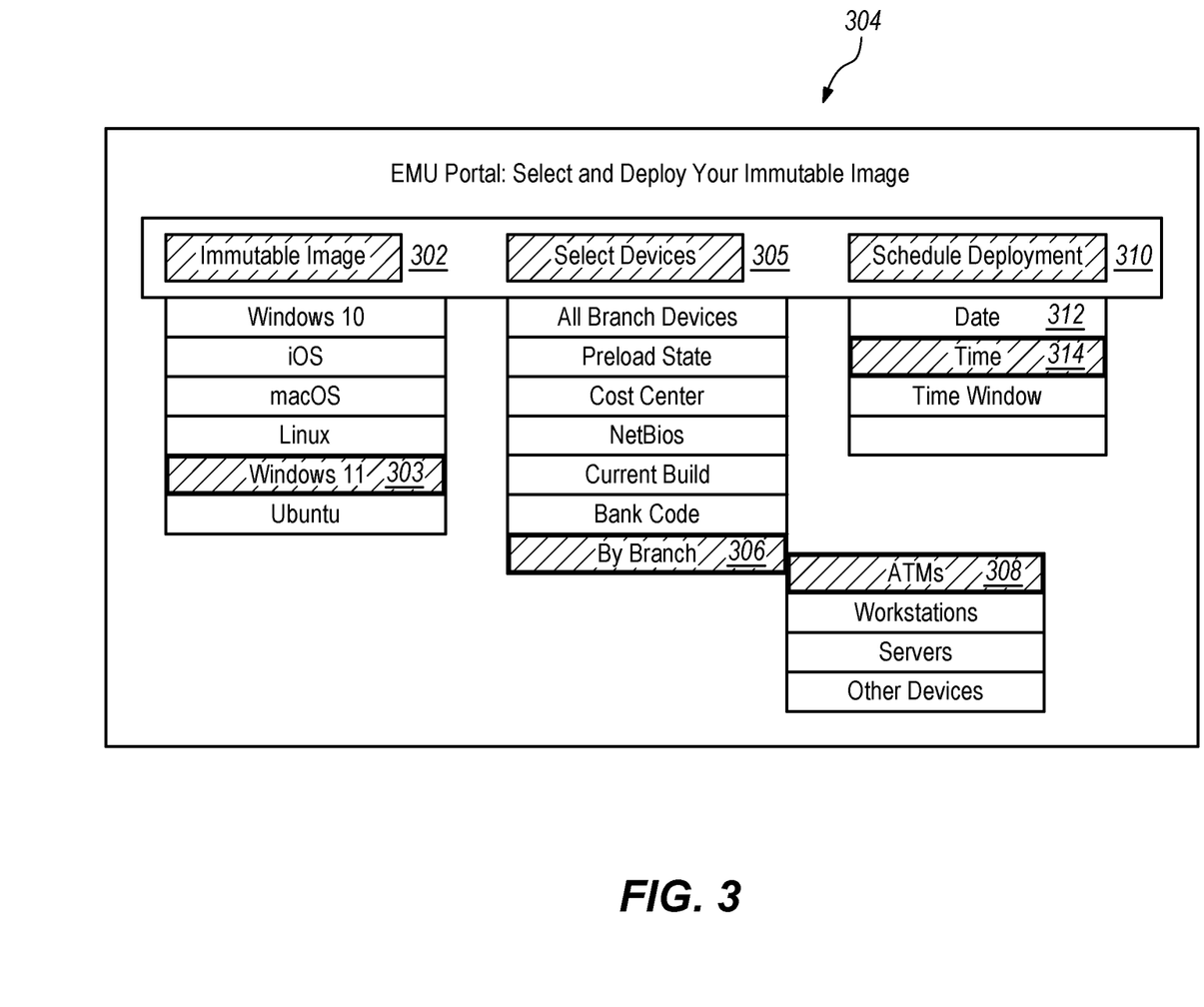
FIG. 3 illustrates an example of the user interface of FIG. 2 showing an EMU (Event Management Utility) Portal.

One implementation of the user interface 204 is shown in FIG. 3. Here, the user interface 204 is an EMU (Event Management Utility) Portal 304 shown in FIG. 3. The EMU Portal 304 facilitates the deployment of immutable images in accordance with one implementation of the present disclosure. As shown by the highlighted text of FIG. 3, the user has selected Immutable Image 302 on the menu, which then displays a number of options including Windows 10, iOS, macOS, Linux, Windows 11, Ubuntu, etc. Here, the user 201 has selected "Windows 11" 303 for deployment.

User 201 can also search for and select the targeted devices, first by selecting Select Devices 305, and then By Branch 306. Here, user 201 has selected ATMs 308 of the first branch as target devices. User 201 can also select target retail devices by Preload State, Cost Center, NetBios, Current Build, etc.

Schedule Deployment 310 is then selected to schedule deployment on a particular day and time by selecting Date 312 and Time 314. The deployment event is submitted to and persists in a database 280 (FIG. 2) until the scheduled time for event message publication.

System Backend

Referring to FIG. 2, the system backend workflow continuously monitors the deployment event, and upon the scheduled event time, the workflow communicates with an agent controller 222 via preload and build event messages sent to databus 230. The agent controller 222 may reside either external of or on the first and second branch retail devices 121, 131 and the main location 141 computing devices.

Agent controller 222 is a control plane that facilitates the preload and build install immutable images by leveraging branch-image deployment event messages published by messaging databus 230. The branch-image deployment event messages may include both preload event messages and build event message. The preload event message triggers the preload of immutable images for staging on the local storage of the remote branch retail device. The preloading of an event procures all impacted devices to begin downloading the associated image. The preload event can only occur after the event start time and before event end time.

Here, preloading facilitates a quicker identification of a problem during the deployment process; not every device may be connected to High-Speed Internet and immutable image download may not always be successful, thus preloading of immutable images allows the system to distinguish between a download and an install issue.

The build events assume the same as a preload event with the additional check on the preloaded event. The build event is the primary driver that sends data to the messaging databus 230 to begin installation of the image. This installation does not occur until the activation time. This is local to the machine and enables updates during off peak hours for reduced impact.

Agent controller 222 communicates with its corresponding agent 223 also residing on the branch retail devices. That is, agent controller 22 can issue commands to the agent 223 for execution on the device. Specifically, based on the published event messages, agent controller 222 communicates with agent 223 to provide instructions as to which software alterations or immutable images to download, as well as to initiate content distribution. As such, in this example, agent controller 222 and agent 223 coordinate the download of Windows 11 immutable images onto the remote first branch location 121 computing systems. Once the OS immutable image is downloaded, the respective device initiates the installation process.

In this manner, the immutable-image deployment to branch retail devices including ATMs is encompassing and self-contained, the immutable image may contain the OS, all software, all patches, all necessary scripts and artifacts for the branch devices to meet operational and security requirements as may be mandated by regulations. And during the installation process, the remote first and second branch retail devices 121, 131 continuously indicate where in the process the installation is. The continuous monitoring data is sent via messaging databus 230 for display on user interface 204 of the event management utility 202. After the remote first and second branch retail devices 121, 131 are booted, a device monitor 270 is leveraged.

Device monitor 270 is an agent capable of running on different retail branch devices ATM's, merchant services terminals, work stations and servers, etc. The device monitor 270 provides two-way communication between event management utility 202 and first branch retail device 121. The device monitor 270 provides the command control ability to issue real-time commands that the remote computer system receives and then streams back responses via the messaging databus 230 to the event management utility 202.

By employing the device monitor 270, the system leverages a network socket 214. Network socket 214 runs on the remote first and second branch retail devices 121, 131, which when booted automatically have a live connection back to event management utility 202. This approach leverages real-time command control from event management utility 202 to the devices without having to open specific ports.

In FIG. 2, branch ticketing tool 460 provides users with technology support, and sources data from the messaging databus 230. Branch ticketing tool 460 provides device and branch data to event management utility 202. When user 201 initially selects targeted devices, it is the branch ticketing tool 460 that provides all of the retail branch device data for selection by user 201. In FIG. 2, Production 290 is a production environment module that stores the latest versions of current immutable image software as deployed within the system.

As can be seen, the deployment management system 102 is an event-driven architecture and is not reliant on a request/reply architecture that is much less efficient. Event-driven architecture provides greater flexibility and much more consistency. If a branch retail device or application is offline, interaction may resume when the application comes back online.

Referring to FIG. 2, the review tool 260 is a smart approval module that enables another team member to review change requests. A change ticket associated with the change request may be generated, and approved by a second user or team member.

If a release engineer is to upgrade, repave or reimage branch retail devices on the system, then that upgrade can be supervised or approved by another team member. All the events that are requested are queued and upon approval, the system automatically executes all of the requested events.

Figures 4, 4A:
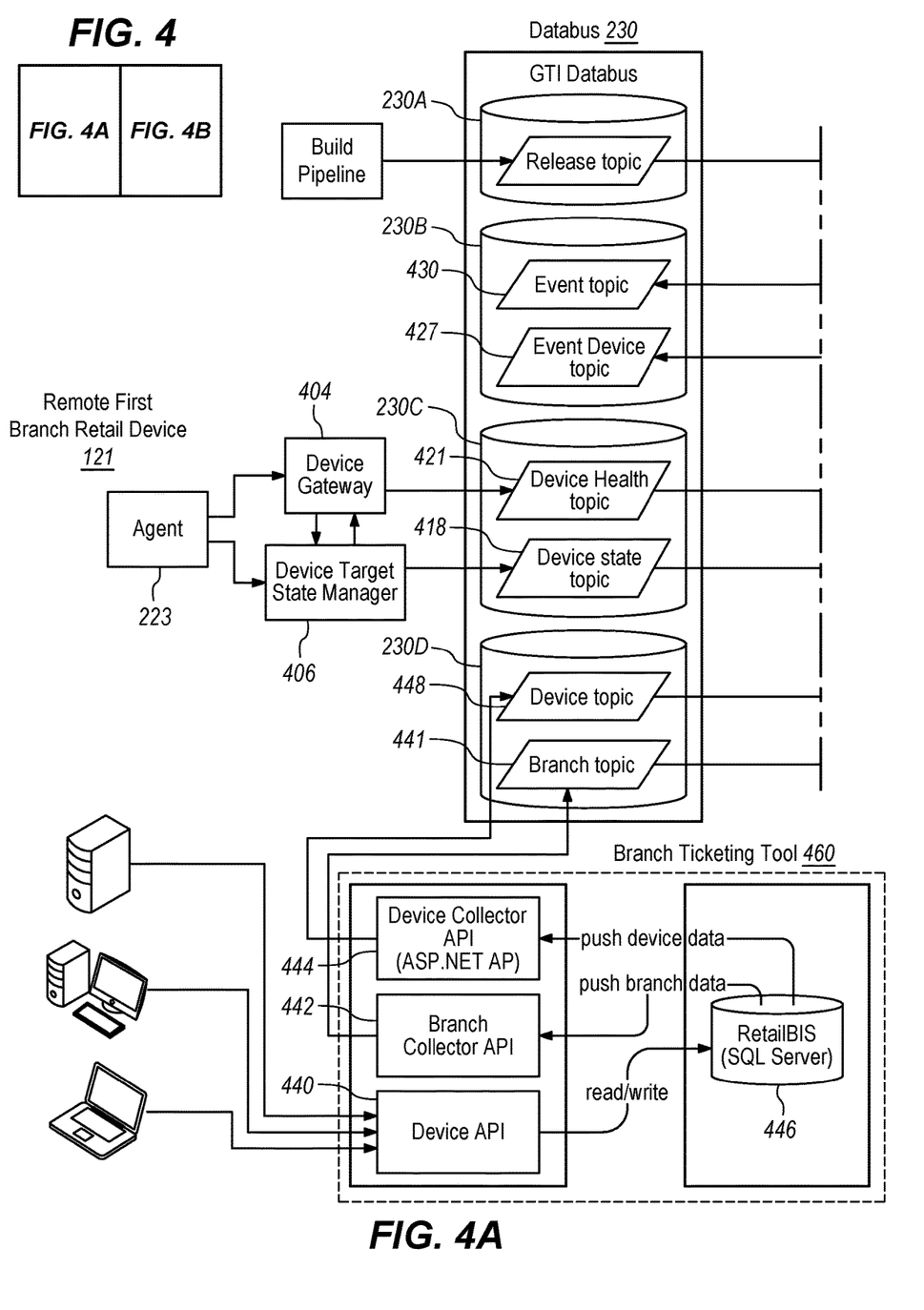
FIG. 4 illustrates the interaction between components of event management utility, the messaging databus and the remote first branch retail device in an example of the present disclosure
Figure 4B:
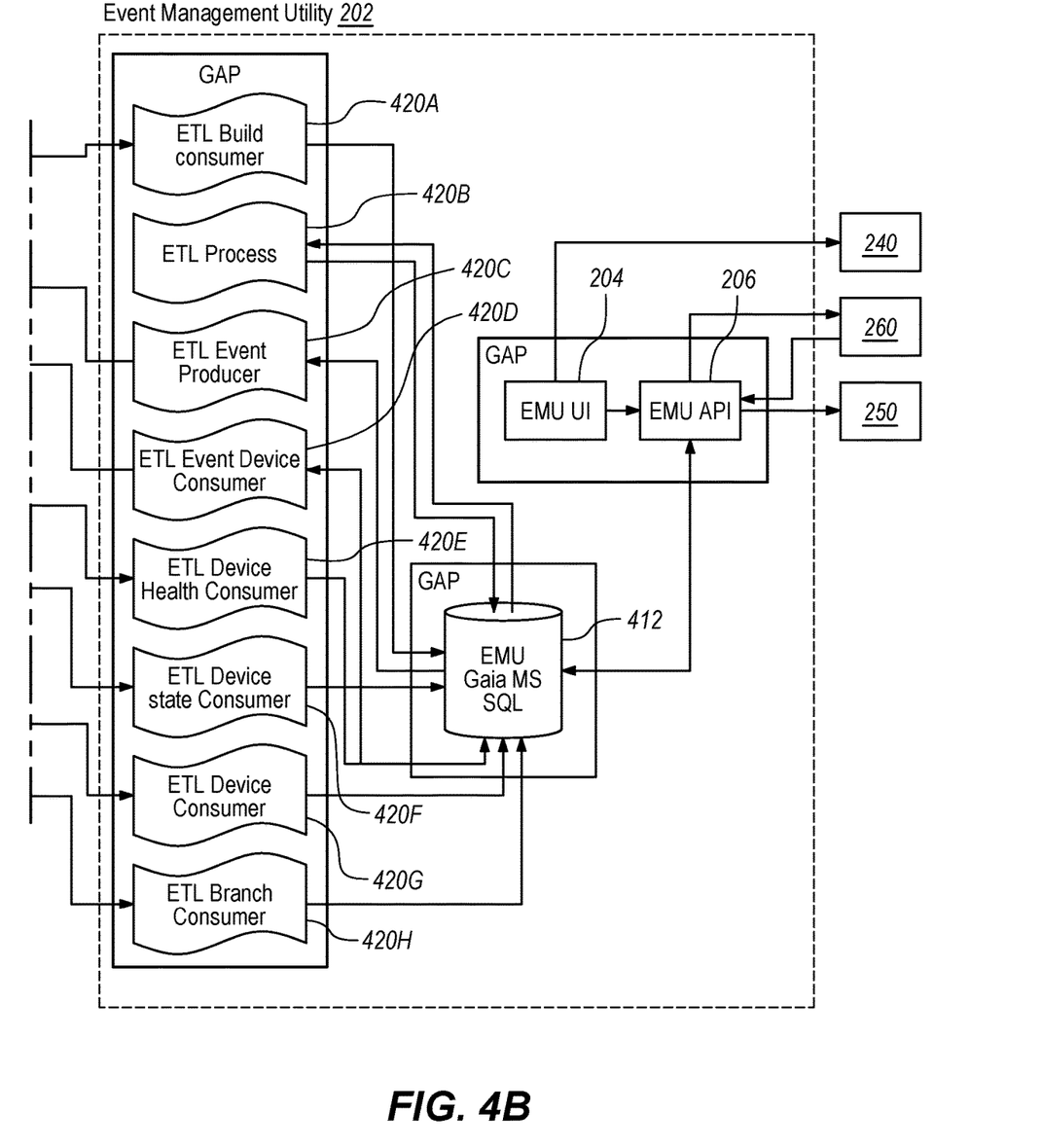

FIG. 4 illustrates the interaction between components of event management utility 202, the messaging databus 230 and the remote first branch retail device 121 in an example of the present disclosure. Although not shown, the first branch retail device 121 can either be the second branch retail device 131 or the main location 141 computing devices.

Here, event management utility 202 interfaces with the message databus 230, which itself interacts with the remote first branch retail device 121 to preload and install a build of an immutable image (e.g., an OS image) on the first branch retail device 121.

In FIG. 4, the first branch retail device 121 includes the agent 223 of FIG. 2, the device gateway 404 and the device target state manager 406. The agent 223 facilitates the preload and build install of an immutable image. Here, both the device gateway 404 and the device target state manager 406 makeup the agent controller 222 of FIG. 2.

The device gateway 404 is an API that fronts all of the business logic and communicates with device target state manager 406. When a target state (e.g., Windows 11) is selected via event management utility 202, a system workflow generates an event message for forwarding to the messaging databus 230 regarding the expected target state. The event message may comprise a preload event message and a build event message.

The device target state manager 406 subscribes to the messaging databus 230 to picks up and store event messages. The device state manager 406 is checked by the agent 223, which runs periodically to check on the device target state. And if the desired target state and the current state do not match, the first branch retail device 121 is queued for uplift. The target state device manager provides instructions to the agent 223 about what the expected target state should be. Based on the preload event message, the agent 223 then triggers the content delivery channel to preload the image. After preload, at the scheduled event time, the agent 223 triggers installation based on the build event message.

In accordance with one example implementation of the present disclosure, the entirety of the image is immutable, and delivered to the first branch retail device 121 such that the immutable image cannot be changed. The immutable image is also auditable because of it is a single image. As opposed to piece-by-piece installation, the entirety of the image is preloaded from the repository 210 (FIG. 2).

In accordance with an implementation of the present invention, the retail branch device is partitioned into at least two partitions. The existing base software remains on the first partition while the immutable image is installed on the second partition. As installation progresses, command control is then used to determine the status of the installation. Command control is a two-way interaction between event management utility 202 and the first branch retail device 121. If installation fails, the process is aborted and roll back occurs. The system boots back up on the existing base software on the first partition. The current and previous states are kept on the computer system at all times. This is an enormous efficiency gain for a multi-retail branch-device enterprise network that is deploying immutable images on as many as 60,000 devices.

In accordance with an implementation of the present disclosure, content delivery of an immutable image is based on co-ordination of various events and messages published by the messaging databus 230.

Referring to FIG. 4, the databus 230 may be for example, a GTI databus with databases 230A, 230B, 230C and 230D. The databases serve to store topics. For example, the database 230C stores device health topics 421 and device state topics 418. Here, the agent 223, the device gateway 404 and the device target state manager 406 stores the device state topic 418 that logs the device states of first branch retail device 121, that is, whether the computer system is active or inactive.

Here, EMU 202 includes a database 412 (e.g. SQL) and various workflows 420A, 420B, 420C, 420D, 420E, 420F, 420G, 420H. Workflow 420F, for example, is an ETL (Extract, Transform, Load) device state consumer. Thus, the device state topic 418 is consumed by workflow 420F for storage in the database 412. Consequently, the API 206 of event management utility 202 can interface with the database 412 to access the device state topic for user interface 204, service management tool 250 and review tool 260.

In a similar manner, the agent 223, the device gateway 404 and the device target state manager 406 also provide device health topic 421 that logs the first branch retail device 121 health states, that is, whether the system is healthy and in the target states. The health state topic is consumed by ETL device health consumer 420E workflow also for storage in a database 412. API 206 interfaces with the database 412 to access the device health topic for use by user interface 204, service management tool 250 and review tool 260. In this manner, according to one aspect of the present disclosure, the device state and health topics about a retail branch device is continuously available to facilitate immutable image installation and the avoidance of drift.

Referring now to FIG. 4, the device state topic consumed by ETL device state consumer 420F workflow is also picked up by ETL event producer 420C that logs event topics 430 in the database 230B of messaging databus 230. The event topics 430 relate to immutable image deployment events as may be requested by user 201. Similarly, the device health topic consumed by ETL device health consumer 420E workflow is also picked up by ETL event device producer 420D that logs event device topics 427 in database 230B. At a first layer, the event topic 430 sends related information to the messaging databus 230, then the event device topics 427 sends the devices for the event in a separate payload. This is because some event metadata information can change, and it is undesirable to change device information after an event has preloaded and also undesirable to send this same payload over and over again. The orchestration of events and corresponding topics thus provides a basis for proper monitoring of the entirety of the system.

Referring to FIG. 4, branch ticketing tool 460 provides device and branch data to event management utility 202. When user 201 initially selects targeted devices, it is the branch ticketing tool 460 that provides all of the retail branch device data for selection by user 201.

Branch ticketing tool 460 includes device API 440, branch collector API 442 and device collector API 444. Device API 440 stores device data on database 446 that is pushed to branch collector API 442 and device collector API 444. The device collector API 444 is a producer for device topic 448 stored in a database 230D. ETL device consumer workflow 420G then consumes the data. The branch collector API 442 is a producer for branch topic 441 stored in database 430D. An ETL branch consumer workflow 420H consumes the data.

Figure 5:
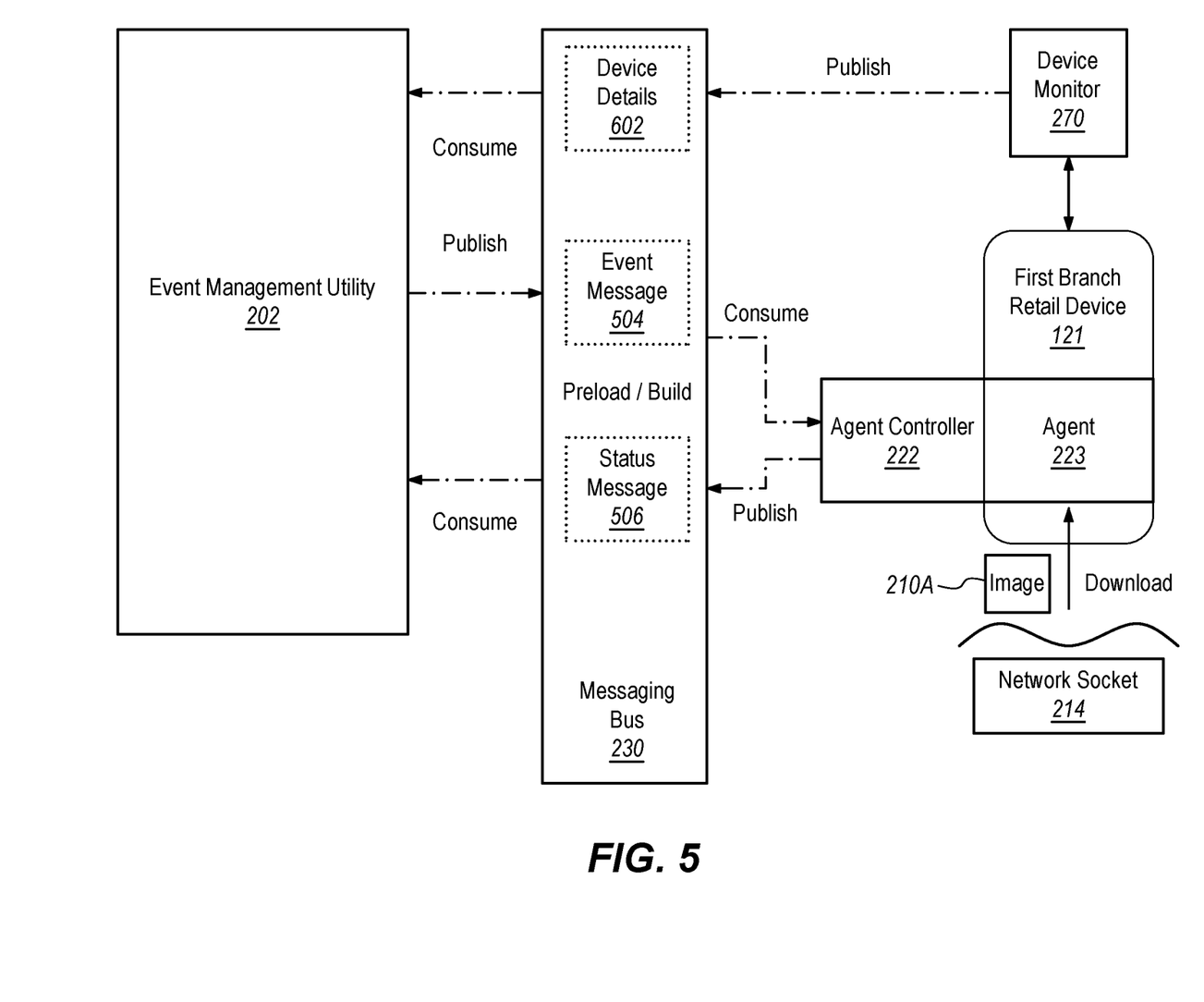
FIG. 5 illustrates system event messaging between EMU and the first branch retail device to facilitate downloading of an immutable image in accordance with examples of the present invention.

FIG. 5 illustrates system event messaging between EMU 202 and the first branch retail device 121 to facilitate downloading of an immutable image 211 in accordance with examples of the present invention.

To initiate deployment, event management utility 202 publishes an event message 504 onto the messaging databus 230. As used herein, an event is the occurrence or the scheduling of the deployment of an immutable image. Specifically, here, the event message 504 is a request to deploy software alterations or immutable images onto the first branch retail device 121. In one implementation, the branch image software 211 (FIG. 2) that is to be deployed is stored in a repository 210 (FIG. 2). The repository 210 may be accessible via a secure network socket 214 (FIG. 2).

In one implementation, the event message 504 published by EMU 202 is comprised of a preload event message and a build event message for the deployment of the branch-image software. Event message 504 can be based on an entity object that may have attributes including an event ID, a name, an access role, a target environment, a start and a stop time, a target build and applicable target devices, for example.

In one example, the preload and build events, may be preceded by a draft, saved, and submitted events. Event statuses are binary for all statuses apart from the build event, which takes continuous feedback from the messaging database 230 to determine build status completion percentages.

The first branch retail device 121 includes an agent 223 that resides on the first branch retail device 121. The agent 223 works in concert with the agent controller 222, to facilitate the installation and deployment of immutable images such as an (OS) Operating System. The deployment is facilitated by agent controller 222 and/or agent 223 subscribing to and consuming event message 504. Specifically, the agent controller 222/agent 223 monitor the messaging databus 230 to detect the preload event message, and responsive to detecting the preload event message, the agent controller 222/agent 223 preloads or downloads the image 211 from the repository 210 onto the remote first branch retail device 121 via secure socket network 214.

The agent controller 222/agent 223 further monitor the messaging databus 230 to detect the build event message. Upon detection of the build event message, the agent 223 installs the downloaded branch image software 210A on the remote first branch retail device 121 in response detecting the build event message.

The agent controller 222 also subscribes to the messaging databus 203 to publish a status message 506 that indicates the status of the installation or deployment as the process proceeds. EMU 202 subscribes to the status message 506 and can consume those messages for display on its user interface.

In FIG. 5, the device monitor 270 provides two-way real-time command and control between the first branch retail device 121 and EMU 202. This two-way real-time command and control facilitates the trouble shooting of issues. Device Monitor 270 may also publish device details 602 and device inventory to the messaging bus 230 for consumption by EMU 202 for inventory and compliance reporting.

Figure 6:
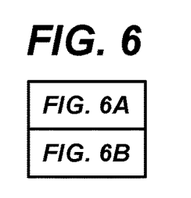
FIG. 6 illustrates a legend regarding FIGS. 6A and 6B.
Figure 6A:
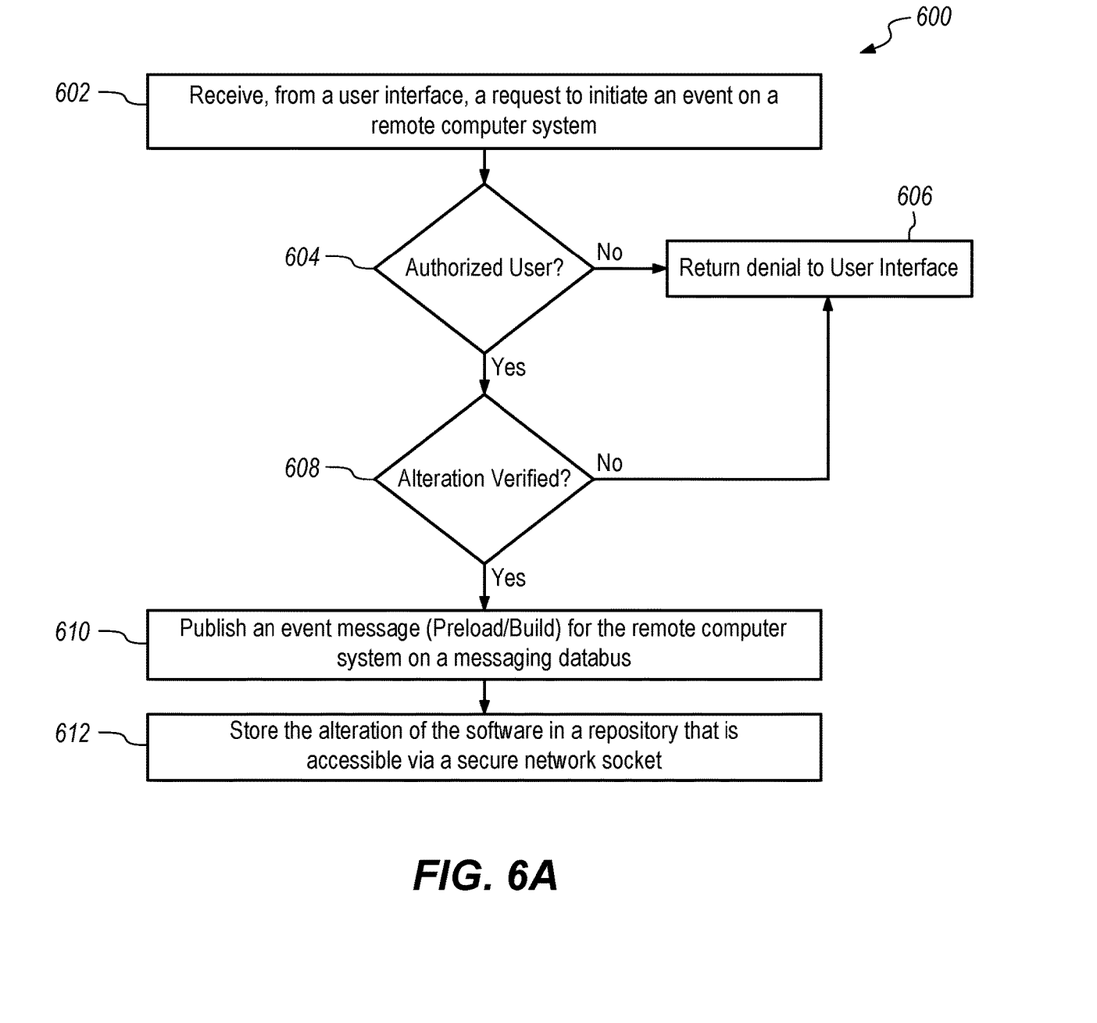
FIG. 6A illustrates a method for deploying immutable images according to an example of the present disclosure.
Figure 6B:
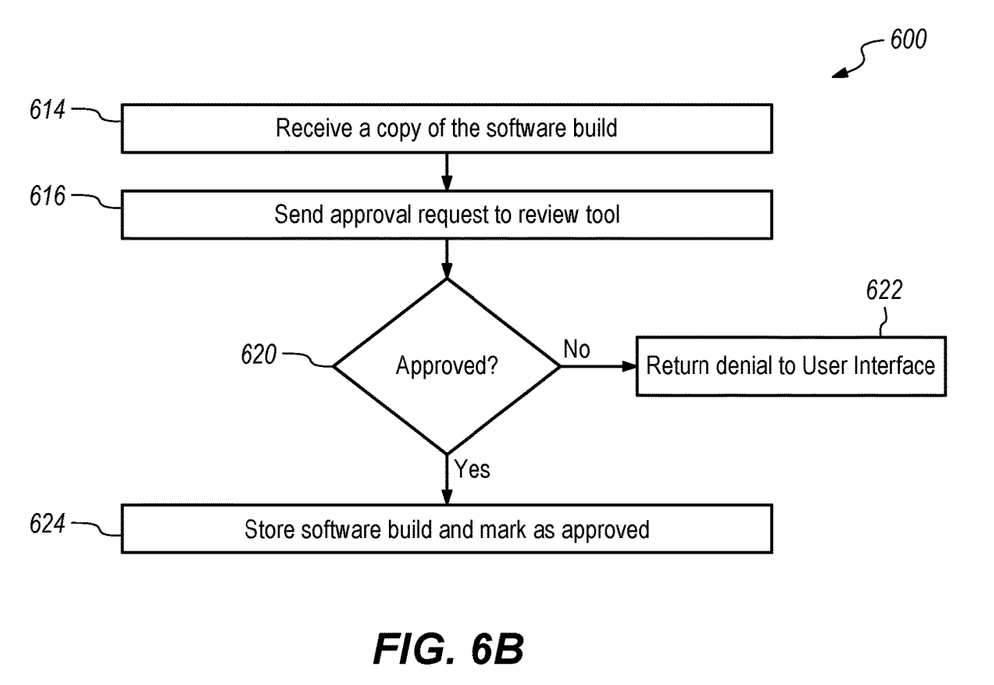
FIG. 6B illustrates a continuation of the method from FIG. 6A for deploying immutable images according to an example of the present disclosure.

FIG. 6A illustrates a method 600 for deploying immutable images according to an example of the present disclosure. FIG. 6B illustrates a continuation of the method from FIG. 6A for deploying immutable images according to an example of the present disclosure.

In FIG. 6A, at block 602, method 600 accesses a signal, over a network via a network communication interface, to initiate an event on a remote first branch retail device. In one example, the event may be initiated by publishing a branch-image deployment event message onto a messaging databus.

Specifically, the accessed signal may be from a user interface to initiate the event on the remote first branch retail device. Note that the event may be initiated on additional remote branch retail devices that satisfy a user-selectable attribute (see e.g., FIG. 3). Method 600 then proceeds to decision block 604.

At decision box 604, it is determined whether the user is authorized to initiate the event. User authorization is determined by the authentication tool 240, which authenticates that the user is an authorized user. If the user is not an authorized user, a denial of service is returned to the user as shown at block 606. If the user is an authorized user, method 600 proceeds to decision block 608.

At decision block 608 (optional), method 600 verifies whether the alteration or deployment. In other words, the particular version of deployment is verified. If the software alteration verification fails, method 600 reverts and sends a denial of service message to the user at block 606. If the software alteration verification succeeds, method 600 proceeds to block 610.

At block 610, the system publishes an event message for the remote first branch retail device on the databus 230. Event messages for the additional remote computer systems may also be published on the messaging databus 230 for consumption by agents associated with the additional remote computer systems. In one implementation, the event message may comprise both a preload event message and a build event message. The preload event message serves to coordinate the download of immutable images from a remote location for staging on the local storage of the remote first branch retail device.

Specifically, the scheduling workflow creates and sends the preload event to the messaging databus 230 to trigger the preload process, handled by the controller and controller agent. The agent 223 publishes the preload status to the controller 222 that owns the preload topic in the databus 230. The preload data consumer will subscribe to the controller 222 owned preload topic to process events and update device state.

At block 612, method 600 stores the immutable images in the repository 230 that is accessible via the secure network socket 214.

In FIG. 6B at block 614, the system downloads a copy of the immutable image software build for staging on its local storage. The messaging databus is monitored to detect the preload event message to initiate the download.

Continuing with FIG. 6B at block 616, an approval request is sent to the review tool 260. Review tool 260 enables all deployments, repaves, etc. to be supervised by a team leader or approved by another team member. All the events that are requested are queued and upon approval, the system automatically executes the deployment. Method 600 then proceeds to decision box 620.

Continuing with FIG. 6B at decision box 620, if the approval request is not granted, then a denial of service is sent to the user at block 622. If the approval request is granted, method 600 proceeds to block 624.

Continuing with FIG. 6B at block 624, installation of the immutable image on the first branch detail device is triggered. Installation may be triggered, by the agent, in response detecting the build event message.

Figure 7A:
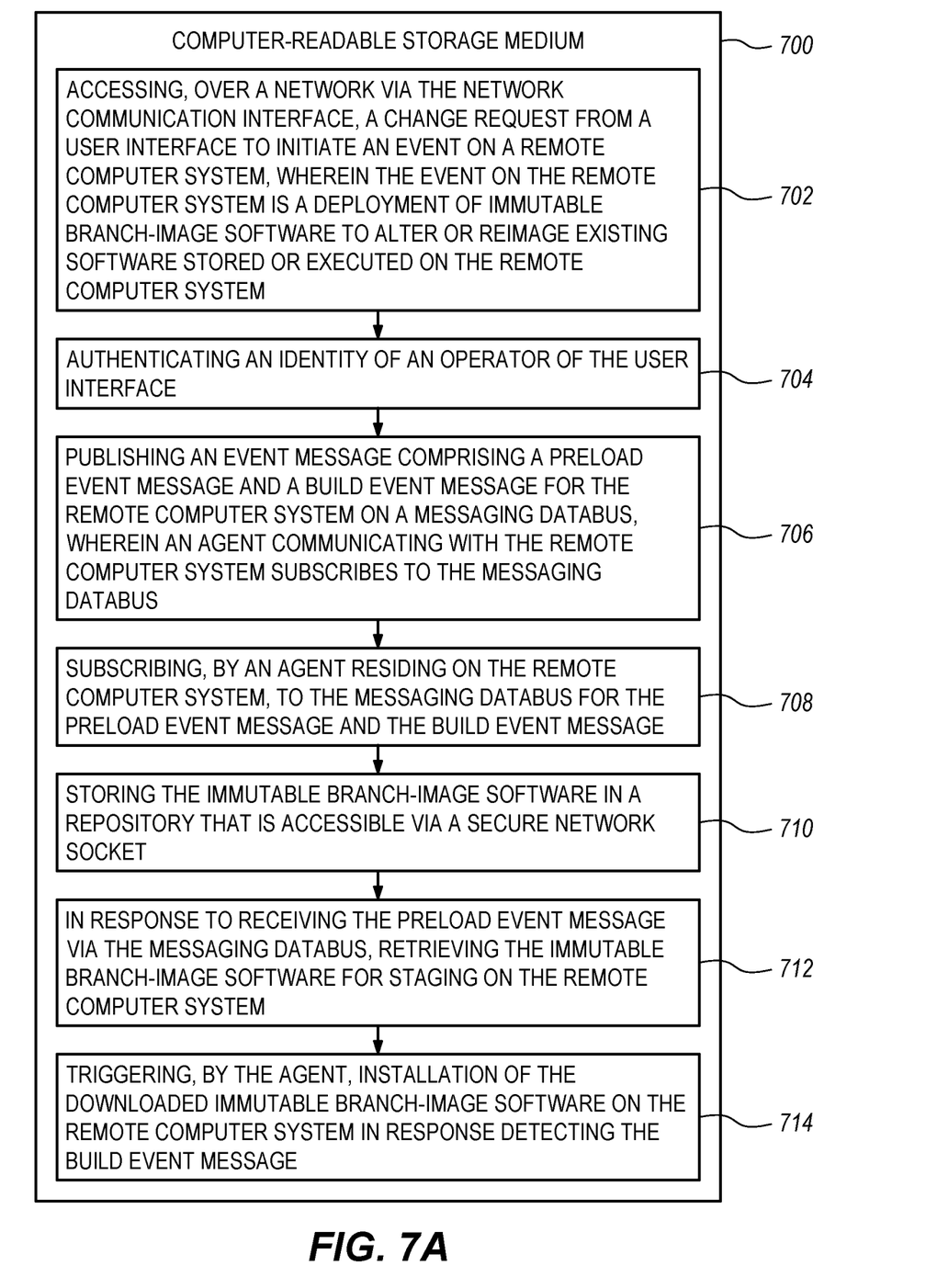
FIG. 7A illustrates example instructions stored on a non-transitory computer-readable storage medium for deploying immutable branch-images according to one example of the present disclosure.
Figure 7B:
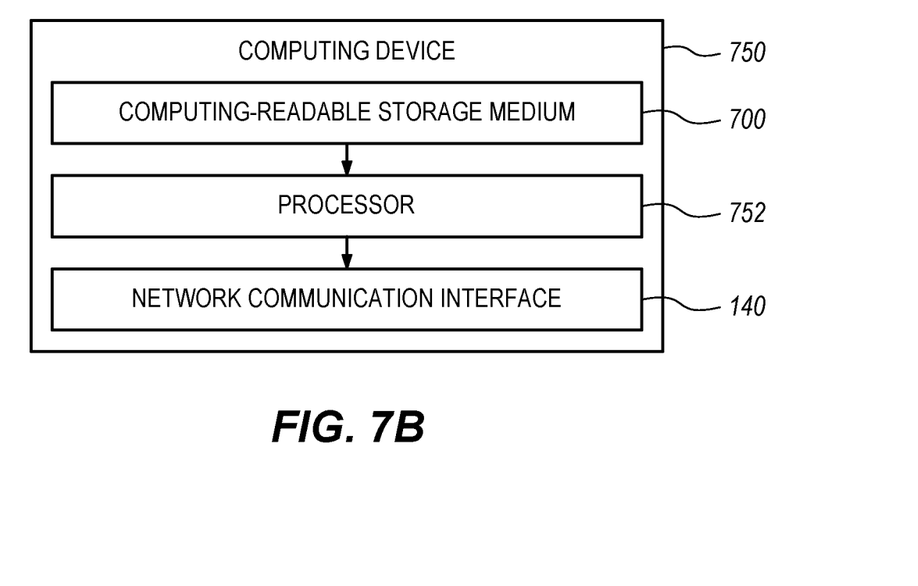
FIG. 7B illustrates an example computing device according to the present disclosure.

FIG. 7A illustrates example instructions stored on a non-transitory computer-readable storage medium 700 for deploying immutable branch-images according to one example of the present disclosure, and FIG. 7B illustrates an example computing device 750 according to the present disclosure.

As shown in FIG. 7A, the non-transitory computer-readable storage medium 700 includes instruction 702, instruction 704, instruction 706, instruction 708, 710 and 712 and 714.

Instruction 702 may cause a processor 752 to access, over a network via the network communication interface, a change request from a user interface to initiate an event on a remote computer system, wherein the event on the remote computer system is a deployment of immutable branch-image software to alter or reimage existing software stored or executed on the remote computer system.

Instruction 704 may cause a processor 752 to authenticate an identity of an operator of the user interface.

Instruction 706 may cause a processor 752, to publish an event message comprising a preload event message and a build event message for the remote computer system on a messaging databus, wherein an agent communicating with the remote computer system subscribes to the messaging databus.

Instruction 708 may cause a processor 752 to subscribe, by an agent residing on the remote computer system, to the messaging databus for the preload event message and the build event message.

Instruction 710 may cause a processor 752 to store the immutable branch-image software in a repository that is accessible via a secure network socket.

Instruction 712 may cause a processor 752, in response to receiving the preload event message via the messaging databus, to retrieve the immutable branch-image software for staging on the remote computer system.

Instruction 714 may cause a processor 752 to trigger, by the agent, installation of the downloaded immutable branch-image software on the remote computer system in response detecting the build event message.

The non-transitory computer-readable storage medium 700 may be any electronic, magnetic, optical, or other physical storage device that stores executable instructions. For example, the non-transitory computer-readable storage medium 700 may be random access memory (RAM), an electrically-erasable programmable read-only memory (EEPROM), a storage drive, an optical disc, or the like. The non-transitory computer-readable storage medium 700 can be encoded to store executable instructions that cause the processor 752 to perform operations according to examples of the disclosure.

The present disclosure may employ a software stack to enlist the underlying tools, frameworks, and libraries used to build and run example applications of the present disclosure. Such a software stack may include PHP, React®, Cassandra™, Hadoop®, Swift®, etc. The software stack may include both frontend and backend technologies including programming languages, web frameworks servers, and operating systems. The frontend may include JavaScript®, HTML, CSS, and UI frameworks and libraries. In one example, a MEAN (MongoDB®, Express.js, AngularJS, and Node.js) stack may be employed. In another example, a LAMP (Linux®, Apache®, MySQL®, and PHP) stack may be utilized.

As used herein, references to modules, engines, etc. refer to self-contained computer modules that have lines of executable code instructions. Each such module comprised of software instructions can be standalone.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including C, C++, Java®, JavaScript®, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A server system comprising:
   a network communications interface;
   a storage medium having instructions;
   a processor that executes the instructions to perform operations comprising:
   accessing a signal, over a network via the network communication interface, to initiate an event on a remote branch computer system and publishing an immutable branch-image deployment event message for the event onto a messaging databus, wherein the event on the remote branch computer system is a deployment of the immutable branch-image software to alter or reimage existing software stored or executed on the remote branch computer system, and wherein the immutable branch-image deployment event message comprises a preload event message and a build event message for the deployment of the immutable branch-image software;
   subscribing, by an agent residing on the remote branch computer system, to the messaging databus for the preload event message and the build event message;
   storing the immutable branch image software in a repository that is accessible via a secure network socket;
   monitoring the messaging databus to detect the preload event;
   downloading, by the agent, the immutable branch-image software from the repository onto the remote branch computer system in response to detecting the preload event message;
   monitoring, by the agent, the messaging databus to detect the build event message; and
   triggering, by the agent, installation of the downloaded immutable branch-image software on the remote branch computer system in response detecting the build event message.

2. The server system of claim 1, wherein the preload event message is based on a preload event object having a plurality of attributes including an event ID, a target build and applicable target devices.

3. The server system of claim 1, wherein the build event message is based on a build event object having a plurality of attributes an event ID, a target build and applicable target devices.

4. The server system of claim 1, wherein the signal is
a change request, via a user interface, to discover the remote branch computer system for deployment based on at least one attribute; and
identify that the remote branch computer system satisfies the attribute.

5. The server system of claim 4, wherein the at least one attribute includes a type of the remote computer system, an identification of the remote computer system, a location of the remote computer system, a health status of the remote computer system, and a current software build of the remote computer system.

6. The server system of claim 1, wherein the remote branch computer system is one of a merchant services terminal and an automatic teller machine.

7. The server system of claim 1, wherein the one or more processors:
discover that additional remote computer systems satisfy the attribute; and
publish event messages for the additional remote computer systems on the messaging databus, wherein agents communicating with the additional remote computer systems subscribe to the messaging databus.

8. The server system of claim 4, wherein the one or more processors:
authenticate the change request; and
generate a change ticket associated with the change request; and approve the deployment associated with the change ticket based on approval by a second user.

9. A non-transitory computer-readable storage medium including computer-executable instructions stored thereon which, when executed by a processor, causes the processor to perform the following operations:
accessing, over a network via the network communication interface, a change request from a user interface to initiate an event on a remote computer system, wherein the event on the remote computer system is a deployment of immutable branch-image software to alter or reimage existing software stored or executed on the remote computer system;
authenticating an identity of an operator of the user interface,
publishing an event message comprising a preload event message and a build event message for the remote computer system on a messaging databus, wherein an agent communicating with the remote computer system subscribes to the messaging databus;
subscribing, by an agent residing on the remote computer system, to the messaging databus for the preload event message and the build event message;
storing the immutable branch-image software in a repository that is accessible via a secure network socket;
in response to receiving the preload event message via the messaging databus, retrieving the immutable branch-image software for staging on the remote computer system; and
triggering, by the agent, installation of the downloaded immutable branch-image software on the remote computer system in response detecting the build event message.

10. The non-transitory computer-readable storage medium of claim 9, wherein the instructions further comprise:
receiving, via the user interface, a request to identify one or more remote computer systems based on at least one attribute; and
identifying that the remote computer system satisfies the at least one criterion.

11. The non-transitory computer-readable storage medium of claim 10, wherein the at least one criterion comprises one or more of an identification of the remote computer system, a type of the remote computer system, a location of the remote computer system, a version of the software of the remote computer system, and a health status of the remote computer system.

12. The non-transitory computer-readable storage medium of claim 10, wherein the instructions further comprise
identifying that one or more additional remote computer systems satisfy the at least one criterion; and
publishing event messages for the one or more additional remote computer systems on the messaging databus, wherein agents communicating with the one or more additional remote computer systems subscribe to the messaging databus.

13. The non-transitory computer-readable storage medium of claim 9, wherein the instructions further comprise:
receiving, via the messaging databus, a message that indicates the status of the alteration of the software; and
generating a visual indication of the status in the user interface.

14. The non-transitory computer-readable storage medium of claim 9, wherein the instructions further comprise:
authenticate the change request; and
generate a change ticket associated with the change request; and
approve the deployment associated with the change ticket based on approval by a second user.

15. The non-transitory computer-readable storage medium of claim 9, wherein the remote computer system is one of a merchant services terminal and an automatic teller machine.

16. A computer-implemented method comprising:
accessing, over a network via the network communication interface, a change request from a user interface to initiate an event on a remote computer system, wherein the event on the remote computer system is a deployment of immutable branch-image software to alter or reimage existing software stored or executed on the remote computer system;
authenticating an identity of an operator of the user interface,
publishing an event message comprising a preload event message and a build event message for the remote computer system on a messaging databus, wherein an agent communicating with the remote computer system subscribes to the messaging databus;
subscribing, by an agent residing on the remote computer system, to the messaging databus for the preload event message and the build event message;
storing the immutable branch-image software in a repository that is accessible via a secure network socket;
in response to receiving the preload event message via the messaging databus, retrieving the immutable branch-image software for staging on the remote computer system; and triggering, by the agent, installation of the downloaded immutable branch-image software on the remote computer system in response detecting the build event message.

17. The computer-implemented method of claim 16, wherein the build event message is based on a preload event object having a plurality of attributes including an event ID, a target build and applicable target devices.

18. The computer-implemented method of claim 16, further comprising: providing a user interface that enables a second user to review change request for approval.

19. The computer-implemented method of claim 16, wherein the remote computer system is one of a merchant services terminal and an automatic teller machine.

* * * * *